(No Model.) 3 Sheets—Sheet 1.

D. BARKER.
GLASS CASTER AND MANUFACTURE OF SAME.

No. 308,590. Patented Dec. 2, 1884.

(No Model.) 3 Sheets—Sheet 2.
D. BARKER.
GLASS CASTER AND MANUFACTURE OF SAME.
No. 308,590. Patented Dec. 2, 1884.
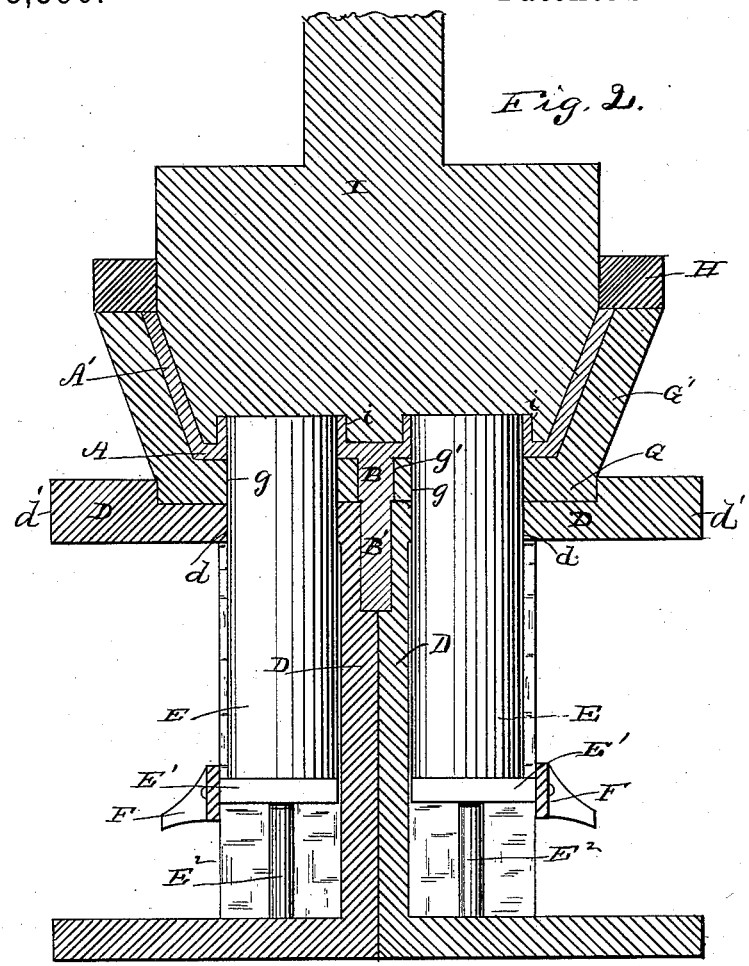
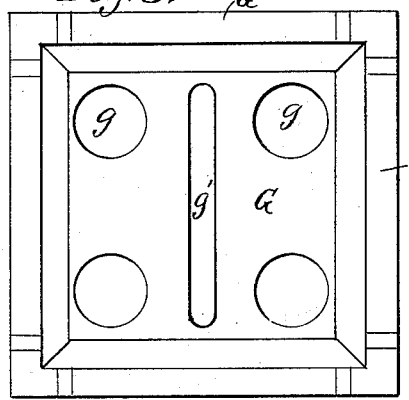
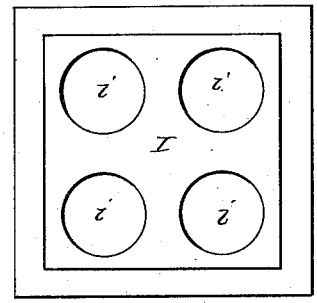
Witnesses:
H. E. Bliss
H. Bunte
Inventor:
David Barker
by Dubleday & Blunatz (No Model.) 3 Sheets—Sheet 3.
D. BARKER.
GLASS CASTER AND MANUFACTURE OF SAME.
No. 308,590. Patented Dec. 2, 1884.
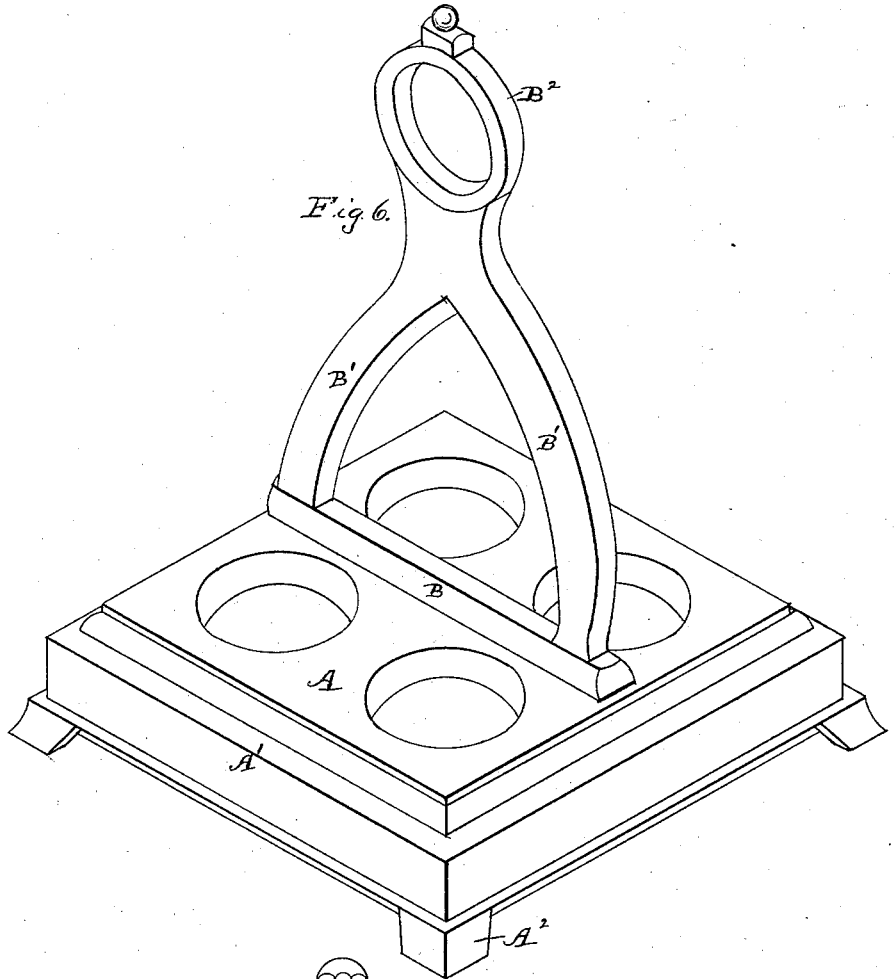
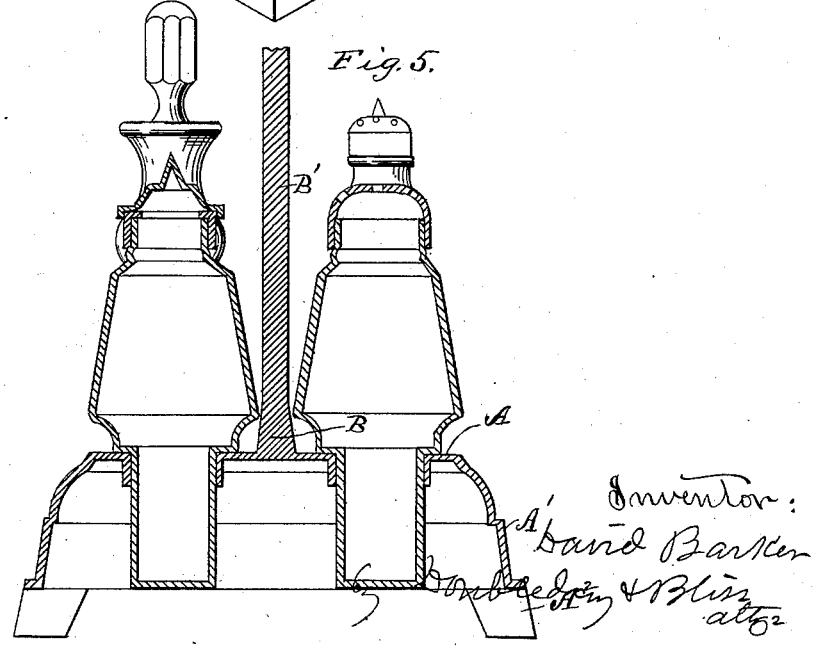

UNITED STATES PATENT OFFICE.

DAVID BARKER, OF CANTON, OHIO, ASSIGNOR TO THE CANTON GLASS COMPANY, OF SAME PLACE.

GLASS CASTER AND MANUFACTURE OF SAME.

SPECIFICATION forming part of Letters Patent No. 308,590, dated December 2, 1884.

Application filed February 8, 1884. (No model.)

*To all whom it may concern:*

Be it known that I, DAVID BARKER, a citizen of the United States, residing at Canton, in the county of Stark and State of Ohio, have invented certain new and useful Improvements in Glass Casters and Manufacture of Same, of which the following is a specification, reference being had therein to the accompanying drawings.

This invention relates to an improvement in the manufacture of glass articles which have, when completed, vertical apertures through one or more plates or portions of the article.

The improvement is especially applicable to the manufacture of such glass articles as caster-stands for table use; and in order that the invention may be clearly understood I have selected for the purpose of illustration a caster-stand of an improved character, which I have devised, and which can be produced by following the method of manufacture to which this case relates.

Heretofore these caster-stands for table use have been made of several parts, sometimes all of the parts being of metal, sometimes part metal and part glass. I have succeeded in devising a stand which, including the handle, the supporting-base, and the apertured part which receives the vessels, can all be made integral. Therefore I can produce a cheap caster-stand which may be made as ornamental as is desired, and can be constructed strong and durable.

An objection heretofore experienced in the manufacture from glass of stands of this character has been that to support the bottles or other vessels it has been necessary to provide large receptacles, the sides and bottom of which have been also constructed of glass, owing to the difficulty of forming a supporting-plate with apertures therein. This I obviate, and provide a caster which has simply apertures adapted to receive the bottles or vessels instead of inclosed chambers or sockets, as has been heretofore common.

Figure 1:
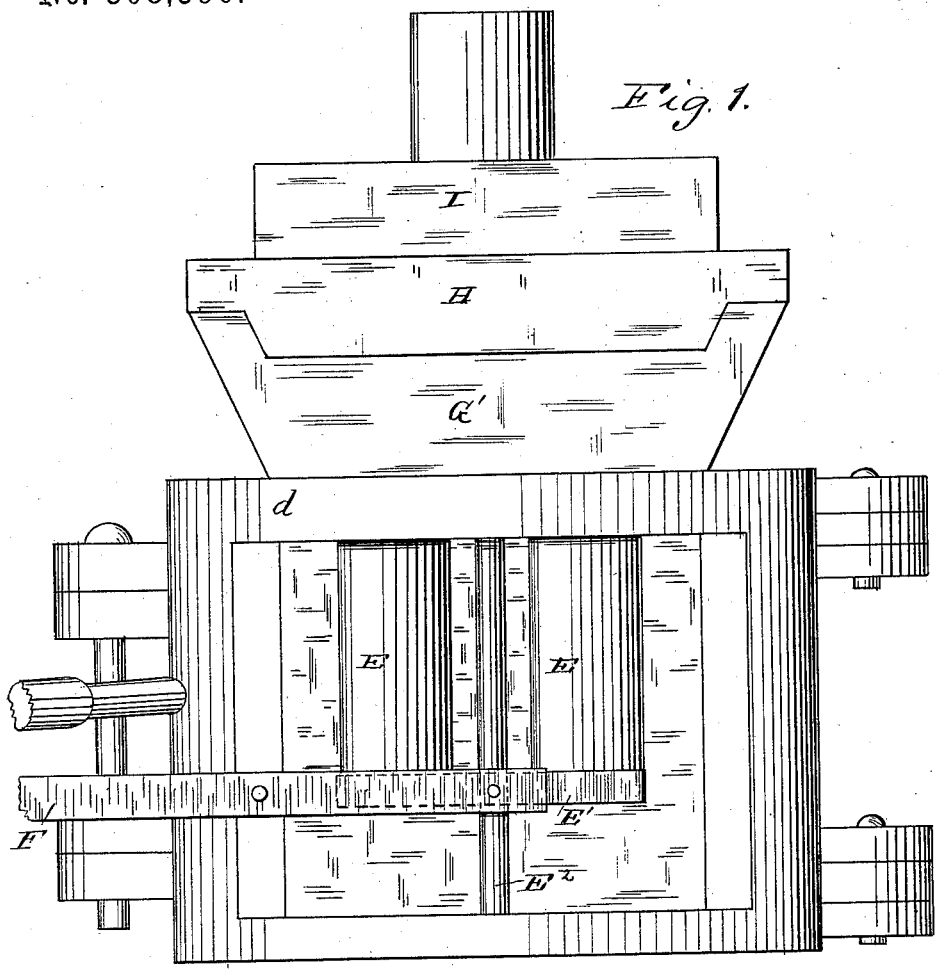
Figure 7:
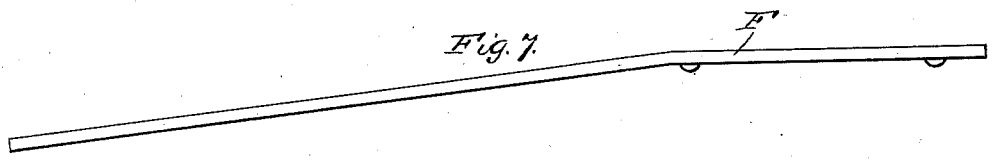
Figure 8:
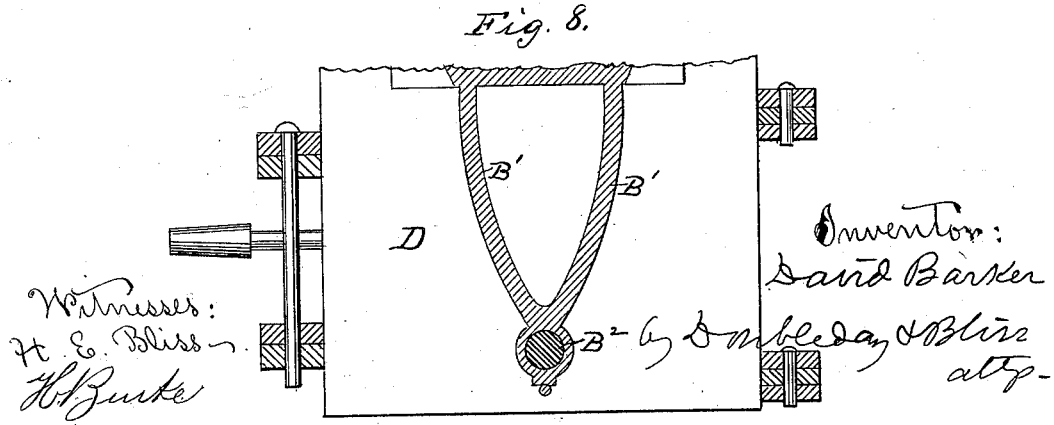

Figure 1 is a side view of a mold adapted to carry out my invention. Fig. 2 is a cross-section on the line $x\ x$, Fig. 1. Fig. 3 is a top plan view of the upper portion of the mold. Fig. 4 is a plan view of the plunger. Fig. 5 is a section of the caster. Fig. 6 shows the caster in perspective. Figs. 7 and 8 are detail views.

In the drawings, A A' A' represent the base or bottom portion of the caster, $A^2$ in the construction shown being legs; A, a plate for supporting the bottles or receptacles, and A' a drooping wall between the parts A and $A^2$. These portions may be ornamented in any of the ways well known to those acquainted with this art.

B B' $B^2$ represent the handle portion, which is also of glass, made integrally with the base or bottom, in the construction shown the part $B^2$ being of the form of a ring that can be easily grasped, the parts B' being curved legs, and the part B being a web connecting the two legs B' B'.

C C represent apertures formed in the base-plate A, they being intended to receive the bottles or receptacles which are to be held by the caster, and each preferably having a downwardly-extending flange, $c\ c$, by means of which the bottles or receptacles can be held steadily in place.

Having thus described the article which is produced by the mold shown, I will set forth the construction and method of operating the latter.

D D represent the lower part of the mold, in which is formed the handle B' $B^2$. Each half of this part of the mold is provided with two vertical apertures at $d\ d$, there being a plate, $d'$, at the upper part extending outward somewhat. E E are pins or short rods of iron adapted to be moved up and down through the apertures $d$. They are connected together by cross-piece E', which latter preferably travels on a guide, $E^2$.

F is a lever pivoted to the bottom part of the mold, the inner end of the lever being pivotally connected to the cross-piece E'. There is one of these levers upon each side of the machine, and it will be seen that whenever necessary the operator can thrust all of the four pins or short bars E up or down.

G G' represent the intermediate portion of the mold, G being a plate, and G' being upwardly and outwardly inclined walls secured thereto, these walls being constructed to produce upon the outside of the bottom portion A' of the caster whatever ornamentation is desired.

$g$ $g$ are apertures corresponding to the apertures $d$ $d$, and which can be situated, respectively, directly above said apertures $d$, so that the pins or bars E E can travel up and down through them.

$g'$ is a slot or elongated aperture in the plate G, it being that portion of the mold adapted to receive the glass which forms the web part B of the handle.

H represents the top part of the mold, it being suitably constructed to give the necessary shape to the bottom of the legs and the other bottom part of the caster.

I is the plunger which is shaped suitably in general to produce the conformation desired for the inside of the bottom part of the caster. It has four sockets, $i$ $i$, corresponding in position vertically to the apertures $g$ $g$ in the parts below, these sockets being, however, somewhat larger in diameter than pins or bars E, so that they are adapted to allow some of the glass to be forced upward to form the flanges $c$ $c$, above mentioned.

The operation of the parts thus described is as follows: The pins or bars E are first thrust into their uppermost position by means of the levers F, and the plunger I is lowered until said pins or bars E rest against the walls of the sockets $i$. Then the requisite amount of glass is introduced into the mold, after which the plunger is lowered, the glass being forced into the recessed portions of the mold that have been above described. As the plunger descends it forces down part way the pins or bars E; but the latter remains sufficiently in contact with the plunger to insure that perfect apertures shall be formed, as at $a$. However, the pins or bars are not driven down far enough by the plunger to allow the hinged lower portions of the mold to be separated, and, therefore, after the plunger has stopped moving, the levers F are used to thrust the pins down below the part G of the mold, after which the hinged portions can be separated to free the handle B' B², and then the part G G' of the mold can be lifted off and the caster can be drawn upward, the parts B B' B² being of such conformation as to pass upwardly through the slot $g'$.

By employing a mold having these features I can very rapidly produce the apertures that are necessary to receive the bottles or receptacles, and by forming such apertures I can dispense with the glass walls that have been heretofore necessary to form receptacles to receive the bottles, and, moreover, can present a new field for design in articles of this kind.

It will be seen that this method of forming apertures in molded glass articles can be also applied in the production of other things than casters.

I do not claim, broadly, the combination, with a mold and an upper plunger, of a bar or supplemental plunger below adapted to move up and down; nor do I claim such a bar or supplemental plunger when arranged to first come in contact with the plunger before the pressure is exerted upon the glass; but in the molds of which I have knowledge the parts were not so arranged as to permit the construction of an article having the distinctive features of mine so far as its relation to the mold is concerned.

The molds above alluded to as heretofore in use have been constructed to form a single central aperture in the article, whereas in my case I have devised a mold which shall simultaneously accomplish several matters—that is to say, it insures that the article when finished shall have several apertures through the glass, and shall also have a centrally-situated projection, (as a handle or similar device.) For such a purpose the molds having the single central apertures previously used cannot be employed.

I believe myself to be the first to have devised a lower mold consisting of two hinged sections, each section having mounted within it supplemental plungers, and having also upon its inner face a recess formed for the reception of glass to produce on the article a projection of the character of a handle, &c. The lower molds or parts of the mold heretofore in use have been solid, and, therefore, to withdraw the finished article has necessitated an operation radically different from that followed in my case. In the mold herein shown not only is the lower portion made in two parts, but the portion immediately above it has a plate, G, which is solid or continuous from side to side, and therefore possesses the advantages well known to be incident to a mold of that character. The hinging of the lower parts of the mold is closely related to the plungers when the latter are arranged in the manner I have shown, as on the one hand it is impossible to withdraw the lower part of the article without opening the hinged parts of the mold, and yet on the other the opening of the lower part depends upon the ability to move the plungers E downward sufficiently far to escape the upper portion, G G', of the mold. Moreover, I believe myself to be the first to have so arranged two supplemental plungers as that they shall be operated simultaneously and move to and fro exactly together, this being accomplished by means of a connecting-bar, as at E', which unites the plungers, and which may be supplemented by the guide and brace E².

I do not claim, broadly, a glass caster having a base or bottom portion provided with apertures for the insertion of bottles or receptacles, as I am aware of the fact that such a caster has been known heretofore.

What I claim is—

1. A mold for making a glass article having an aperture or apertures, said mold having a lower part, consisting of two portions hinged together, in combination with a movable bar, pin, or plunger mounted in one of said hinged portions away from the central plane of the mold, one or more movable bars, pins, or plungers similarly mounted in the other hinged portion, the inner faces of said hinged portions being recessed to receive a portion of the glass, the upper solid portion of the mold, and a plunger, I, which, when moving, actuates the movable bars, pins, or plungers, substantially as set forth.

2. The combination of the upper portion, G G', of the mold, provided with the aperture $g$ in the bottom, and central aperture, $g'$, the lower part of the mold consisting of two hinged portions having recesses upon their adjacent faces communicating with the aperture $g'$, the plunger I, and the rods or bars adapted to move in the apertures $g$ in the upper part of the mold, substantially as set forth.

3. The combination, with the glass-mold, of the movable bars, rods, or plungers E E, the guide $E^2$, connecting devices E', and the swinging or vibrating levers F, substantially as set forth.

4. The combination, with the lower part of the mold, consisting of the two hinged portions formed with recesses or chambers on the sides, and with inner walls or plates, D D, and an upper horizontal plane with apertures $d$ therein, of the movable rods or plungers situated within the chambers formed in the sides of the hinged portions of the mold, and adapted, substantially as set forth, to be reciprocated on lines away from the central plane of the mold, whereby the lower part of the mold may receive glass to form a projection in the finished article, and at the same time the mold can be adapted to form apertures or recesses in the glass away from the central plane of the article, substantially as set forth.

5. The herein-described glass caster, it having the main plate A, provided with through-sockets and downwardly-depending flanges around the said apertures, and upwardly-rising legs B B', joined together at the top, and at the bottom united independently of each other to the body of the caster, whereby a firm support can be provided for the handle with a small amount of glass, substantially as set forth.

6. The herein-described molded glass caster, it having the main plate A, provided with through-apertures and downwardly-depending flanges around the said apertures, the downwardly-drooping walls A' at the edges of the plate A, the legs $A^2$, the two upwardly-rising handle-legs B' B', joined at the top, and the web or flange B at the bottom, which unites said legs and joins them to the plate A, substantially as set forth.

In testimony whereof I affix my signature in presence of two witnesses.

DAVID BARKER.

Witnesses:
W. W. CLARK,
JOS. K. BROWN.